(12) United States Patent
Yoo

(10) Patent No.: US 12,354,181 B2
(45) Date of Patent: Jul. 8, 2025

(54) GRAPHICS PROCESSING UNIT INCLUDING DELEGATOR AND OPERATING METHOD THEREOF

(71) Applicant: SAMSUNG ELECTRONICS CO., LTD., Suwon-si (KR)

(72) Inventor: Jeongjoon Yoo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 325 days.

(21) Appl. No.: 17/372,851

(22) Filed: Jul. 12, 2021

(65) Prior Publication Data

US 2022/0067872 A1 Mar. 3, 2022

(30) Foreign Application Priority Data

Aug. 28, 2020 (KR) ........................ 10-2020-0109473

(51) Int. Cl.
*G06F 9/48* (2006.01)
*G06N 3/063* (2023.01)
*G06T 1/20* (2006.01)

(52) U.S. Cl.
CPC ................ *G06T 1/20* (2013.01); *G06F 9/485* (2013.01); *G06F 9/4881* (2013.01); *G06N 3/063* (2013.01)

(58) Field of Classification Search
CPC ........ G06T 1/20; G06V 10/82; G06V 10/955; G06F 9/4881; G06F 9/485; G06N 3/063

USPC ......................................................... 712/220
See application file for complete search history.

(56) References Cited

U.S. PATENT DOCUMENTS

| | | | |
|---|---|---|---|
| 8,842,122 B2 | 9/2014 | Nordlund et al. | |
| 10,026,145 B2 | 7/2018 | Bourd et al. | |
| 10,482,565 B1 | 11/2019 | Chen et al. | |
| 10,489,205 B2 | 11/2019 | Munshi | |
| 10,521,874 B2 | 12/2019 | Rao et al. | |
| 2012/0147387 A1* | 6/2012 | Morrison | G06K 15/1857 358/1.1 |
| 2017/0109214 A1* | 4/2017 | Raman | G06F 9/4881 |
| 2017/0277643 A1* | 9/2017 | Zhou | G06F 1/3206 |
| 2017/0353397 A1 | 12/2017 | Che | |
| 2018/0052776 A1* | 2/2018 | Zhao | G06F 12/109 |
| 2019/0370059 A1 | 12/2019 | Puthoor et al. | |
| 2020/0183738 A1* | 6/2020 | Champigny | G06F 9/5016 |
| 2020/0201648 A1* | 6/2020 | Memon | G06F 9/54 |
| 2020/0293367 A1* | 9/2020 | Andrei | G06F 13/4282 |
| 2021/0294646 A1* | 9/2021 | Hassaan | G06F 9/4881 |

\* cited by examiner

*Primary Examiner* — Chun Kuan Lee
(74) *Attorney, Agent, or Firm* — Sughrue Mion, PLLC

(57) ABSTRACT

A graphics processing unit (GPU) configured to process a neural network is provided. The GPU includes: a graphics core configured to execute a plurality of kernels; and a delegator connecting an input and an output of the plurality of kernels based on dependency between the plurality of kernels, and configured to output an event indicating a result of a neural network process.

16 Claims, 17 Drawing Sheets

| Kernels | fence | Syncs | Syncs_optm | mObj_ID |
|---|---|---|---|---|
| Kernel1 | – | – | – | – |
| Kernel2 | Fence1 | $\{sync1_1\}$ | $\{sync1_1\}$ | $[m_2 : m_3]$ |
| Kernel3 | Fence2 | $\{sync2_1, sync3_1\}$ | $\{sync2_1, \textbf{sync2}_1\}$ | $[m_4, m_3 : m_5]$ |
| Kernel4 | Fence3 | $\{sync1_4\}$ | $\{sync1_4\}$ | $[m_6 : m_7]$ |
| Delegator | Fence4 | $\{sync1_5\}$ | $\{sync1_5\}$ | $[m_8 : null]$ |

NN DATA

FIG. 18

| Name | Parameters | Descriptions |
|---|---|---|
| create_indirect_pipe(context, pipe_size, pipe_properties, errcode_ret) | context: cl context<br>pipe_size: define n in indirect n-pipe<br>Pipe_properties: when packet in the pipe is removed (READ, NREAD, ALWAYS) | create an indirect pipe with pipe_properties.<br>READ: deleted at pipe when read once<br>NREAD: deleted at pipe when read n-th<br>ALWAYS: never deleted |
| write_indirect_pipe(pipe, addr) | pipe: pipe object<br>addr: address that the data is stored | push address to indirect pipe |
| read_indirect_pipe(pipe) | pipe: pipe object. | pop address from indirect pipe.<br>After pop, its contents is removed depending on the pipe_properties defined when the pipe is created |

BUILT-IN FUNCTION

GRAPHICS PROCESSING UNIT INCLUDING DELEGATOR AND OPERATING METHOD THEREOF

CROSS-REFERENCE TO RELATED APPLICATION

This application is based on and claims priority under 35 U.S.C. § 119 to Korean Patent Application Numbers 10-2020-0109473, filed on Aug. 28, 2020 in the Korean Intellectual Property Office, the disclosure of which is incorporated by reference herein in its entirety.

BACKGROUND

One or more embodiments relate to a graphics processing unit, and more specifically, to an electronic device including a graphics processing unit configured with a delegator for delegating a plurality of kernels, and an operating method of the graphics processing unit.

As semiconductor technology becomes highly integrated and machine learning performance continues to improve, neural networks modeling biological brains are being designed using electronic devices including mobile devices.

Because data transmission occurs in every kernel between a central processing unit (CPU) requesting neural network processing and the graphics processing unit (GPU) driving the neural network, a technology for reducing a delay caused during data processing is required.

SUMMARY

Provided is a delegator configured to reduce interactions that occur between a central processing unit and a graphics processing unit.

According to an embodiment, there is provided a graphics processing unit (GPU) configured to process a neural network. The GPU includes: a graphics core configured to execute a plurality of kernels; and a delegator connecting an input and an output of the plurality of kernels based on dependency between the plurality of kernels, and configured to output an event indicating a result of a neural network process.

The delegator receives and refers to neural network data indicating layer information of the neural network.

The delegator generates an indirect-pipe storing an address of execution result data of a first kernel among the plurality of kernels, and a second kernel among the plurality of kernels accesses and refers to the indirect-pipe storing the address of the execution result data of the first kernel.

The GPU further includes a first command processor configured to process a command.

The first command processor includes the delegator.

The delegator is executed by the command processor.

The delegator is integrated in the command processor or provided as an independent unit separate from the command processor.

The first command processor includes: a command interpreter configured to determine whether a neural network process is required based on the command; and a dispatcher configured to schedule a process of a task according to the command.

The delegator includes: a neural network data reader configured to receive neural network data indicating layer information of the neural network; an event listener configured to receive a kernel event indicating execution completion of each of the plurality of kernels; an indirect-pipe manager configured to manage an indirect-pipe based on the neural network data; a kernel launcher configured to execute the plurality of kernels; and an event notifier configured to generate an event indicating completion of the neural network process.

The indirect-pipe manager includes: a lifecycle manager configured to create, update and remove the indirect-pipe; and a pipe scheduler configured to adjust a processing order of the indirect-pipe.

According to an embodiment, there is provided an operating method of a graphics processing unit (GPU) configured to process a neural network by executing a plurality of kernels including a first kernel and a second kernel. The operating method includes: referring to neural network data indicating layer information of the neural network from a memory; generating a data structure based on the neural network data; executing the first kernel; monitoring a kernel event indicating completion of the first kernel execution; updating the data structure in response to the kernel event; delegating the first kernel and the second kernel based on the neural network data; and outputting an event indicating a result of the neural network process.

The operating method further includes requesting an execution of the second kernel.

The generating of the data structure includes: creating an indirect-pipe storing an address of a region in the memory in which an execution result of each of the plurality of kernels is stored; and creating an input memory object and an output memory object of each of the plurality of kernels storing addresses of input data and output data of each of the plurality of kernels, respectively.

The generating of the indirect-pipe includes creating in advance at least one of indirect-pipes corresponding to dependency of the first kernel based on the neural network data.

The updating of the data structure includes writing an address of execution result data of the first kernel to the indirect-pipe.

The delegating of the first kernel and the second kernel includes storing an address of the indirect-pipe to an input memory object of the second kernel.

According to an embodiment, there is provided an electronic device configured to process a neural network. The electronic device includes: a central processing unit (CPU) including a user mode driver and a kernel mode driver, and configured to drive a host program; and a graphics processing unit (GPU) including a graphics core and a delegator, and configured to execute a plurality of kernels including a first kernel and a second kernel. The CPU generates neural network data based on layer information of the neural network, and issues a neural network command based on the neural network data, and the GPU connects inputs and outputs of the plurality of kernels based on the neural network data in the neural network command, and outputs an event that is a result of a neural network process.

The user mode driver analyzes dependency between the plurality of kernels for driving the neural network according to a request for the neural network process, generates the neural network data, and stores the event.

The delegator creates an indirect-pipe storing an address of a region in which an execution result of each of the plurality of kernels is stored, and stores in the indirect-pipe an address of execution result data of a first kernel among the plurality of kernels, and a second kernel among the plurality of kernels accesses and refers to the indirect-pipe storing the address of the execution result data of the first kernel.

The delegator creates an input memory object and an output memory object of each of the plurality of kernels storing addresses of input data and output data of each of the plurality of kernels, respectively, and stores an address of the indirect-pipe to the input memory object of the second kernel.

According to an embodiment, there is provided an execution method of an open computing language (openCL) configured to be driven in a central processing unit (CPU). The execution method includes: verifying a request for neural network process; analyzing dependency between a plurality of kernels constituting the neural network; generating neural network data based on the dependency; generating a neural network command for executing the plurality of kernels; storing the neural network command to a queue; flushing the neural network command stored in the queue; and storing an event in response to the neural network command.

The execution method further includes optimizing the neural network data.

According to an embodiment, there is provided an execution method of an open computing language (openCL) configured to be driven in a central processing unit (CPU). The execution method includes: adding neural network processing application programming interface (API) including a command queue, neural network data, and an event as variables to an API combination; and adding an indirect-pipe generation function, an indirect-pipe input function, and an indirect-pipe read function to a built-in library.

According to an embodiment, there is provided an electronic device configured to process a neural network. The electronic device includes: a first processor configured to execute an open computing language (openCL); and a second processor including a delegator and configured to execute a plurality of kernels. The first processor generates neural network data based on layer information of the neural network, and issues a neural network command based on the neural network data. The second processor connects inputs and outputs of the plurality of kernels by based on the neural network data in the neural network command, and outputs an event indicating a result of a neural network process.

BRIEF DESCRIPTION OF THE DRAWINGS

The above and other aspects, features and advantages of certain embodiments of the disclosure will be more apparent from the following description taken in conjunction with the accompanying drawings in which:

FIG. 18 is a table of a built-in library according to an embodiment; and

DETAILED DESCRIPTION

Hereinafter, embodiments of the disclosure will be described in detail with reference to the accompanying drawings.

Figure 1:
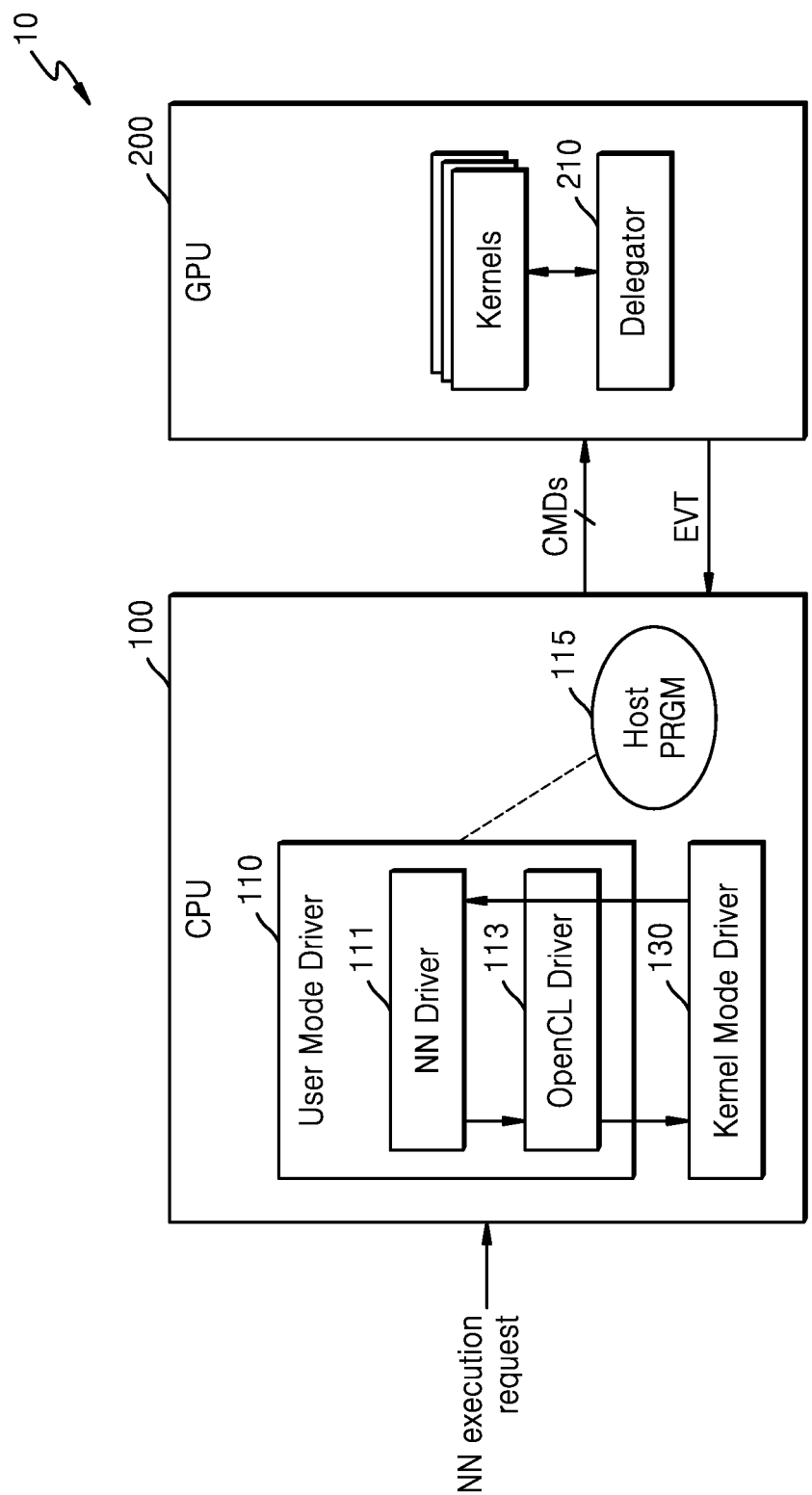
FIG. 1 is a block diagram of an electronic device according to an embodiment.

FIG. 1 is a block diagram of an electronic device 10 according to an embodiment.

The electronic device 10 may extract valid information by analyzing input data in real time based on a neural network, determine a situation based on the extracted information, or control at least one component included in the electronic device 10. For example, the electronic device 10 may be applied to a drone, an advanced drivers assistance system (ADAS), a robot, a smart TV, a smart phone, a medical device, a mobile device, an image display device, a measurement device, an internet of things (IoT) device, or the like, and in addition, may be used as an electronically implemented device of various kinds.

The electronic device 10 may include a central processing unit (CPU) 100 and a graphics processing unit (GPU) 200. The CPU 100 may control overall operations of the electronic device 10. The CPU 100 may process data in response to a request of a host or an input of a user.

The CPU 100 may be classified into a complex instruction set computer (CISC) having a complex structure and a reduced instruction set computer (RISC), according to a command set type. The CISC may provide various command formats, and RISC may provide a high computation speed.

The CPU 100 may include a user mode driver 110 and a kernel mode driver 130. The user mode driver 110 may include a neural network (NN) driver 111 and an open computing language (openCL) driver 113. The user mode driver 110 may not access a main portion of a system (for example, a kernel address region), but may drive a program (or application) requested by the host or the user. In other words, the user mode driver 110 may drive a host program (PRGM) 115.

The NN driver 111 may drive various programs for the NN execution. For example, the NN driver 111 may perform numerical computations for machine learning by driving a tensor flow.

The openCL driver 113 may include a driving device for executing an openCL. The openCL may be a general parallel computing framework developed by the Khronos Group, a non-profit technology consortium. By executing the openCL by using the openCL driver 113, programs written between different processors from each other may be executed.

The openCL driver 113 may execute an application programming interface (API) for the NN execution. The API may be a communication format defined between an operating system (OS) and an application, and may be a rule for accessing a library. The openCL driver 113 may access the library for executing various kernels by executing the API for the NN execution.

The openCL driver 113 may refer to the library for executing a kernel for the NN, such as sub-sampling, convolution, deconvolution, softmax, pooling, normalization, concatenation, quantization, dequantization, rectified linear activation function (ReLu), activation, arithmetic computation, and the like.

Because the kernel mode driver 130 may access all address regions, the system stability may need to be secured. Accordingly, the kernel mode driver 130 may drive only an authorized (or signed) program. The kernel mode driver 130 may manage resources of the GPU 200. For example, the kernel mode driver 130 may perform functions related to an operating system, such as memory management and context switching.

The GPU 200 may process an operation related to graphics. The GPU 200 may, for a graphics-related operation, include a command processor configured to receive and process commands from the CPU 100, a dispatcher configured to schedule commands to respective computing cores, vertex fetching for geometry processing, a vertex shading operation unit, a camera conversion unit, a rasterizer converting data in units of pixels, a texturing that maps and filters data in units of pixels, a pixel shading operation unit for calculating colors of data in units of pixels, and a rendering output unit configured to perform blending, anti-aliasing, and other post-processing. The GPU 200 may increase floating-point arithmetic performance by employing a graphics acceleration function, and reduce the computational burden of the CPU 100.

According to an exemplary embodiment, because the GPU 200 may perform parallel computation, the GPU 200 may quickly perform complex matrix computation required by deep learning to which NN technology is applied. Accordingly, the GPU 200 may generate the NN, train or learn the NN, perform an operation based on received input data, and be used as a processor for retraining the NN. Models of the NN may include various kinds of models such as a convolution (C) NN (CNN) (e.g., GoogleNet, AlexNet, and VGG network), a region (R) with CNN (R-CNN), an R proposal network (RPN), a recurrent (R) NN (RNN), a stacking (S)-based deep NN (DNN) (SDNN), a state-space (SS) DNN (S-SDNN), a deconvolution network, a deep belief network (DBN), a restricted Boltzmann machine (RBM), a fully convolutional network, a long short-term memory (LSTM) network, and a classification network, but are not limited thereto. The GPU 200 may include one or more processing cores for executing a calculation according to the models of the NN.

The GPU 200 may include a delegator 210. The delegator 210 may generate zdata structure related to a plurality of kernels driven by a graphics core included in the GPU 200, and may connect and delegate inputs and outputs between the plurality of kernels. The delegator 210 is described in more detail with reference to FIGS. 9A through 9D, 10, and 12.

The GPU 200 may include a separate memory for storing programs corresponding to the models of the NN as an internal memory. In addition to the GPU 200, for NN execution, an NN-dedicated processor, which is referred to as an NN processor, an NN processing device, an NN integrated circuit, or an NN processing unit (hereinafter, NPU), or the like, may be further included in the electronic device 10.

According to an exemplary embodiment, in response to an NN execution (processing) from a host or a user, the CPU 100 may drive an application by using the NN driver 111, and may issue a plurality of commands CMDs including a command for network execution, as a result of accessing kernels required for the NN execution requested via the openCL driver 113. The GPU 200 may execute kernels required for the NN execution, and may output to the CPU an event EVT indicating a result of the NN execution by delegating input/output between the kernels.

According to an embodiment, the delegator 210 may control input/output of kernels in the GPU 200, and provide only the result to the CPU 100 as the event EVT.

As semiconductor technology becomes highly integrated and machine learning performance continues to improve, the NN having an architecture similar to that of biological brains is being developed and executed in electronic devices including mobile devices. Communication for the kernel execution result and generated data for every kernel may occur between the CPU 100 requesting the NN execution and the GPU 200 driving the NN. When an interaction occurs between the CPU 100 and the GPU 200 for every kernel execution, the execution time of the kernel may be extended. This may cause a decrease in the speed of the NN execution in light of a trend in machine learning technology requiring more kernel execution. In addition, when the interaction between the CPU 100 and the GPU 200 occurs at every kernel execution, because the kernel of the NN is mostly executed by the graphics core, the CPU 100 may unnecessarily consume standby power, or unnecessarily occupy resources that may be otherwise available for performing other functions or tasks.

The electronic device 10 according to the one or more embodiments of the disclosure reduce power consumption of the CPU 100, by reducing interactions that occur between the CPU 100 and the GPU 200, and improve the speed of the NN execution.

The electronic device 10 may not be limited to the configuration illustrated in FIG. 1, and may further include at least one intellectual property (IP) block. For example, the electronic device 10 may further include at least one IP block requiring the NN execution, such as the aforementioned NN processor, an external memory, a storage, and a sensor.

Figure 2:
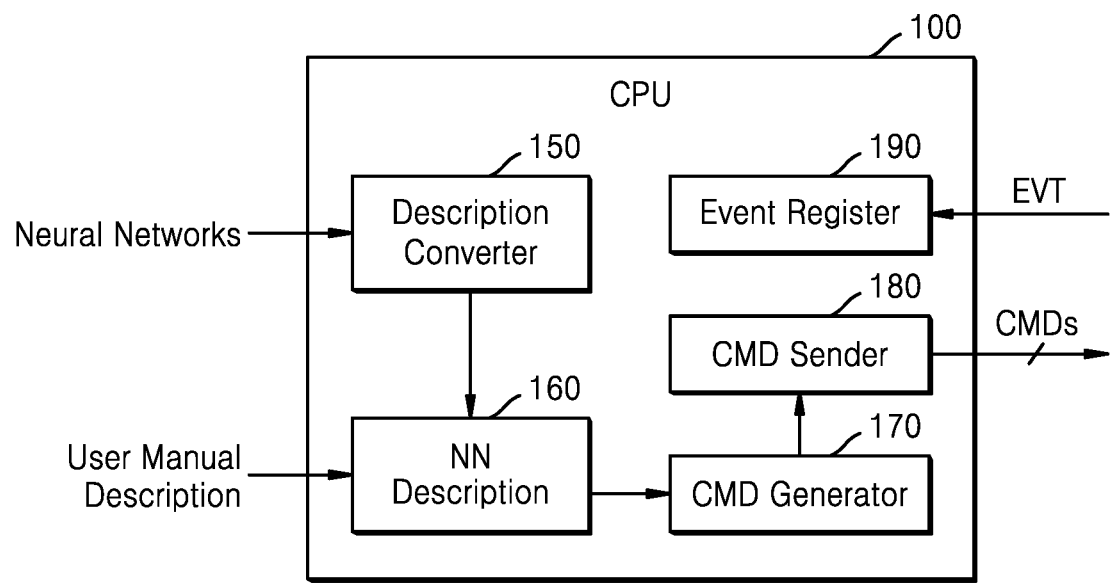
FIG. 2 is a block diagram of a central processing unit according to an embodiment.

FIG. 2 is a block diagram of the CPU 100 according to an embodiment. Repeated descriptions given with reference to FIG. 1 are omitted.

Referring to FIG. 2, the CPU 100 may include an arithmetic logic unit (ALU) responsible for comparison, determination, and computation, a control logic responsible for interpretation and execution of commands, and a register storing a loaded command, data, and/or a computation result. The ALU may include an adder performing various additions and obtaining results, an accumulator that is a register temporarily storing the results of arithmetic and logical computations, and a register that is a temporary storage device. The control logic may include a program counter controlling an execution order of programs, an instruction register temporarily storing contents of the command currently being executed, and an instruction decoder sending a control signal to a device decoding and performing commands stored in the instruction register.

The CPU 100 according to an exemplary embodiment may include a description converter 150, an NN description 160, a command (CMD) generator 170, a command (CMD) sender 180, and an event register 190.

The description converter 150 may receive a request from a host or a user, and convert the request into a language suitable for the CPU 100. The NN description 160 may classify and organize NN information by further referring to a user manual description, because the request of the host or user is a description of the NN. For example, the NN description 160 may classify layer information about the NN, such as the number of kernels of the NN to be executed, connectivity between kernels, and dependencies on kernels.

The command generator 170 may generate NN data based on information about the NN that is classified in the NN description 160. In an example embodiment, the command generator 170 may generate an NN command referring to the NN data, and a plurality of commands CMDs including commands other than a command for the NN execution. The generated plurality of commands CMDs may be provided to the GPU 200 by the command sender 180. For example, the plurality of commands CMDs may be provided to a command queue of the GPU 200.

The event register 190 may provide a command corresponding to an event generation request to the GPU 200 via the kernel mode driver 130 in FIG. 1, in response to completion of the NN execution and receiving event EVT from the GPU 200. Specifically, the event EVT may be stored in a storage managed by the kernel mode driver 130 and a storage of the GPU 200. As the NN execution is completed, the GPU 200 may generate the event EVT, and the generated event EVT may be sent to the host PRGM 115 of the CPU 100 via the kernel mode driver 130 and the openCL driver 113.

The description converter 150, the NN description 160, the command generator 170, and the command sender 180 may be separately implemented as processing circuits such as hardware including digital logic circuits, or may be implemented as a combination of hardware and software such as a processor executing software. In particular, a processing circuit may be implemented with a CPU, an arithmetic logic unit (ALU) that performs arithmetic and logical computations, bit shifting, and the like, a digital signal processor (DSP), a microprocessor, and an application specific integrated circuit (ASIC), or the like, but is not limited thereto.

Figure 3:
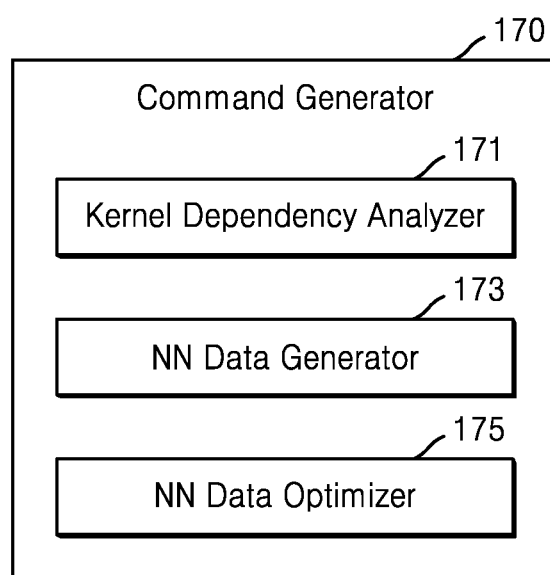
FIG. 3 is a block diagram of a command generator according to an embodiment.
Figure 4:
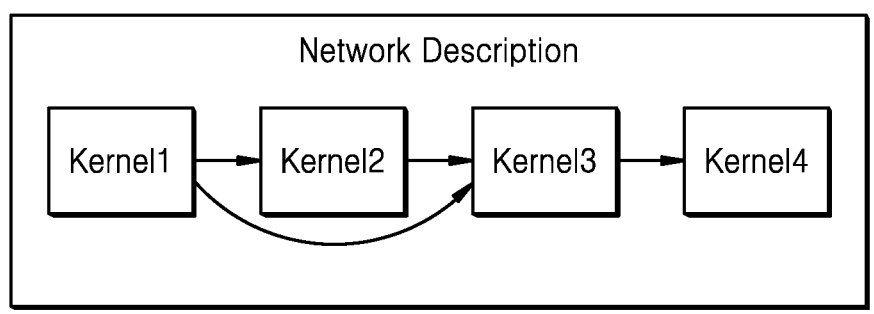
FIG. 4 is a conceptual diagram illustrating dependency of a neural network, according to an embodiment.

FIG. 3 is a block diagram of the command generator 170 according to an embodiment, and FIG. 4 is a conceptual diagram illustrating dependency of the NN, according to an embodiment.

Referring to FIG. 3, the command generator 170 may include a kernel dependency analyzer 171, an NN data generator 173, and an NN data optimizer 175.

In an example embodiment, the kernel dependency analyzer 171 may analyze dependency between kernels constituting the NN. The kernel dependency analyzer 171 may receive layer information about the NN, and analyze a mutual dependency relationship between the kernels constituting the NN.

FIG. 4 describes the kernel dependency. According to an example embodiment, an NN requested to be executed may include four kernels. An execution result of a first kernel Kernel1 may be provided as an input to a second kernel Kernel2 and an input to a third kernel Kernel3. An execution result of the second kernel Kernel2 may be provided as an input to the third kernel Kernel3. To execute the third kernel Kernel3, both an output of the second kernel Kernel2 and an output of the first kernel Kernel1 may be required. An execution result of the third kernel Kernel3 may be provided as an input to a fourth kernel Kernel4.

The dependency of the NN described above is assumed for convenience of description, and the one or more embodiments of the disclosure do not exclude various number of kernels and connectivity.

Referring again to FIG. 3, the kernel dependency analyzer 171 may analyze dependency between a plurality of kernels constituting the NN, and may generate input and output relationships for executing the plurality of kernels.

The NN data generator 173 may generate the NN data based on layer information about the NN including the number of kernels of the NN, connectivity between the kernels, dependency, or the like, and the NN optimizer 175 may optimize the NN data. The NN data is described in more detail with reference to FIGS. 6 and 7.

As described above, the kernel dependency analyzer 171, the NN data generator 173, and the NN optimizer 175 may be separately implemented as processing circuits such as hardware including digital logic circuits, or a combination of hardware and software such as a processor executing software.

Figure 5:
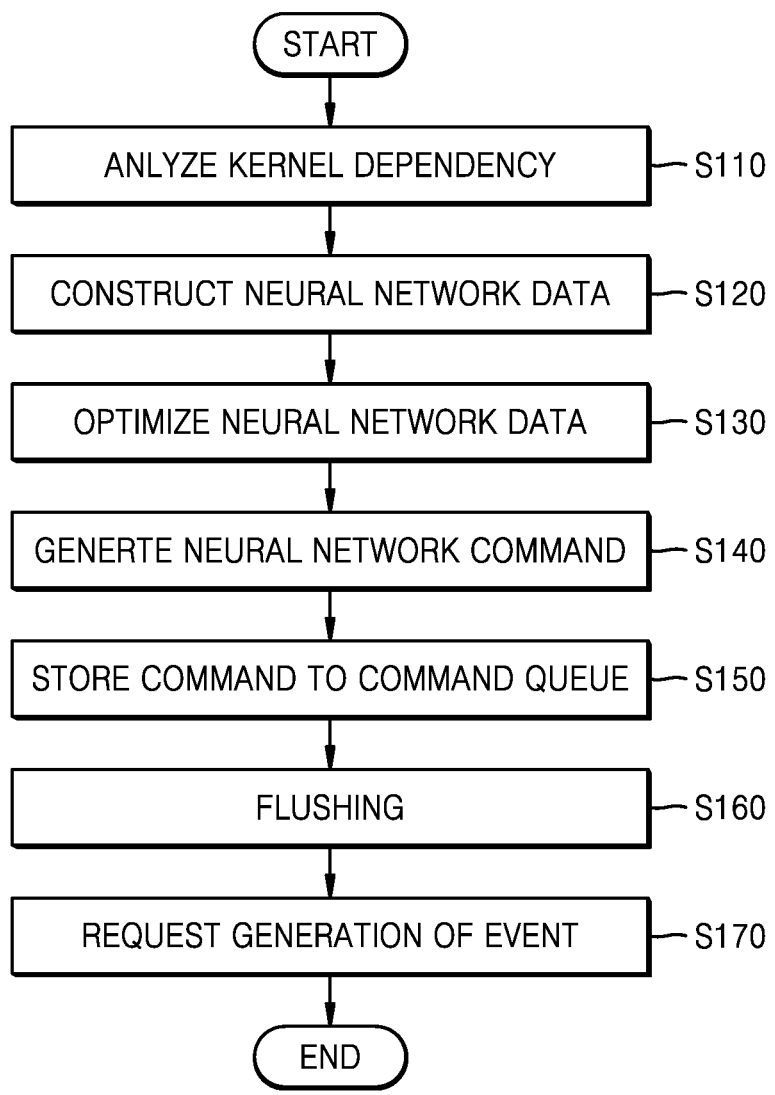
FIG. 5 is a flowchart of a sequence in which an open computing language (openCL) is executed for neural network process, according to an embodiment.

FIG. 5 is a flowchart of a sequence in which the openCL is executed for the NN execution, according to an embodiment. FIGS. 1 through 3 may also be referred to in the description of FIG. 5.

Referring again to FIG. 1, the openCL driver 113 may operate according to a request for the NN execution from the user or the host. By executing an API for the NN execution in the host program 115, the openCL driver 113 may refer to a library for performing certain operations by the kernels for the NN, such as sub-sampling, convolution, deconvolution, softmax, pooling, normalization, concatenation, quantization, dequantization, ReLu, activation, and arithmetic computation.

Referring to FIG. 5, the kernel dependency analyzer 171 may receive layer information about the NN, and analyze a mutual dependency relationship between kernels constituting the NN (S110).

The NN generator 173 may generate the NN data based on the layer information about the NN that has been classified in the NN description 160 (S120). The NN data may include the number of kernels of the NN, connectivity between the kernels, dependency, input/output relationships between the kernels, syncs, fences, memory objects, or the like.

The NN optimizer 175 may optimize the NN data by removing a portion of the NN data that is irrelevant to the amount of computation or the computation speed (S130). Because there is dependency between the kernels, it may be possible to verify whether a preceding kernel has been executed by only verifying a trailing kernel of the preceding and trailing kernels. In an example embodiment, the generated NN data or optimized NN data may be stored in a memory.

The command generator 170 may generate an NN command referring to the NN data, and the plurality of commands CMDs including commands other than the command for the NN execution (S140).

The command sender 180 may provide the plurality of commands CMDs to the GPU 200 (S150). As a result, the plurality of commands CMDs may be stored in the command queue of the GPU 200. In an example embodiment, the command queue may be implemented as a circular queue to prevent overflow, but is not limited thereto. Commands CMD may be stored as pointers in the command queue.

The command queue may be flushed (S160). The flushed command queue may be used to execute the kernels in the GPU 200. In an example embodiment, as the command queue is flushed, the flushed command queue may be sent to a device queue included in the GPU 200.

Based on the NN execution being completed by the GPU 200, the event register 190 may provide a command for requesting to generate the event EVT corresponding to the executed NN to the GPU 200 via the kernel mode driver 130 (S170). In this case, both a synchronization method of waiting until the event EVT arrives, and an asynchronous method of giving away resources to the CPU 100 on an assumption of being in a standby state and waking up when the event EVT arrives, may be supported. When the NN execution is completed in the GPU 200, the GPU 200 may generate a corresponding event EVT, and the generated event EVT may be sent to the host PRGM 115.

Figure 6:
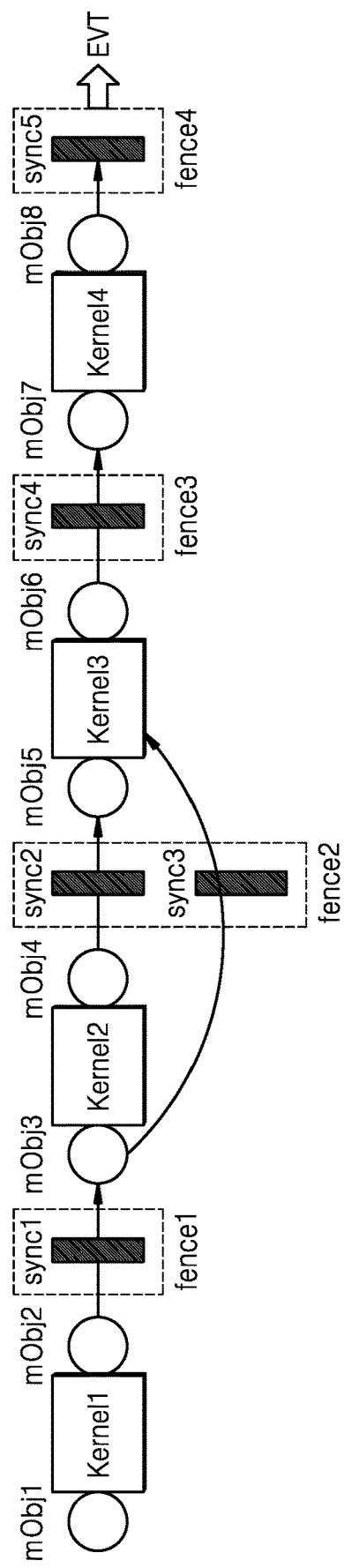
FIG. 6 is a conceptual diagram illustrating a structure of a neural network, according to an embodiment.
Figures 7, 8:
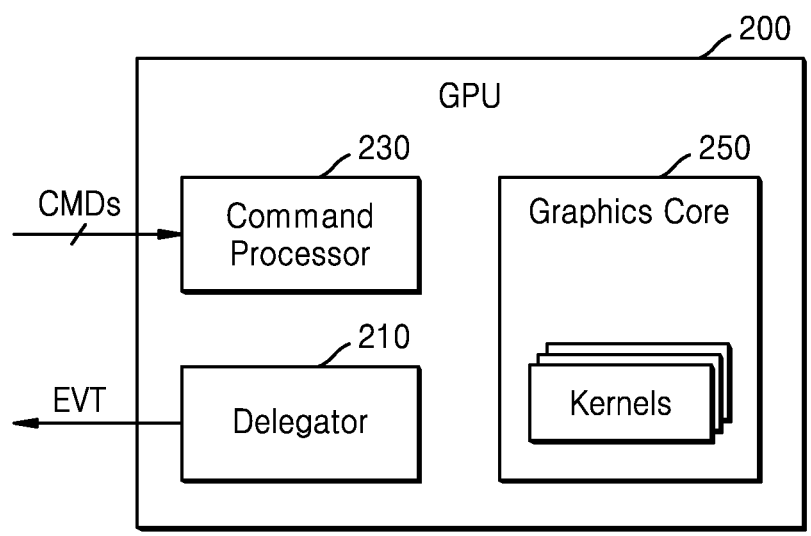
FIG. 7 is a table of neural network data according to an embodiment.
FIG. 8 is a block diagram of a graphics processing unit according to an embodiment.

FIG. 6 is a conceptual diagram illustrating a structure of an NN, according to an embodiment, and FIG. 7 is a table of NN data NNDAT according to an embodiment. A method of generating the NN data NNDAT according to a hierarchical structure of the NN may be described with reference to FIGS. 6 and 7. FIG. 4 is also referred to in describing FIGS. 6 and 7.

Referring to FIG. 6, the NN may include four kernels similar to those in FIG. 4, and dependency between the kernels may also be similar to that in FIG. 4. In other words, an execution result of the first kernel Kernel1 may be provided as an input to the second kernel Kernel2 and an input to the third kernel Kernel3, an execution result of the second kernel Kernel2 may be provided as an input to the third kernel Kernel3, and an execution result of the third kernel Kernel3 may be provided as an input to the fourth kernel Kernel4.

Each kernel may include an input memory object and an output memory object. A memory object may be metadata including information about a location and type of data to be accessed by the kernel. The input memory object may be a data structure that stores an address of data that is input to execute the kernel, and the output memory object may be a data structure that stores an address of execution result data of the kernel. The memory object may store all information about data, such as a start address (for example, a physical address) of a space in which data is stored, a data type, and the number of pieces of data. In an example embodiment, the memory object may be predefined by the NN description 160 in FIG. 2.

In an example embodiment, the first kernel Kernel1 may have a first memory object mObj1 as an input memory object, and a second memory object mObj2 as an output memory object. Similarly, the second kernel Kernel2 may have a third memory object mObj3 as an input memory object and a fourth memory object mObj4 as an output memory object, the third kernel Kernel3 may have a fifth memory object mObj5 as an input memory object and a sixth memory object mObj6 as an output memory object, and the fourth kernel Kernel4 may have a seventh memory object mObj7 as an input memory object and an eighth memory object mObj8 as an output memory object.

A sync may be used to verify whether all data has been input before the kernel is executed. The sync may prevent the output memory object from being referenced as the input memory object before all target data is input. After an address is written to the output memory object of each kernel, the sync may be activated. When the sync is activated, the output memory object may be referenced by the input memory object. Due to properties of the kernel dependency, a preceding sync may be changed by a trailing sync.

According to an embodiment, a first sync sync1 may be between the second memory object mObj2 and the third memory object mObj3, a second sync sync2 may be between the fourth memory object mObj4 and the fifth memory object mObj5, a third sync sync3 may be between the third memory object mObj3 and the fifth memory object mObj5, a fourth sync sync4 may be between the sixth memory object mObj6 and the seventh memory object mObj7, and a fifth sync sync5 may be between the eighth memory object mObj8 and a termination. For example, when an execution of the first kernel Kernel1 is completed and an address of the kernel execution data is written in the second memory object mObj2 that is the output memory object, the first sync sync1 may be activated.

A fence may be a set of syncs. The fence may be activated when all syncs included therein are activated. The fence may adjust an execution order so that a consumer kernel is executed after a producer kernel has been executed, regardless of an execution command of the kernel, among the producer kernels producing data and the consumer kernels consuming data.

In an example embodiment, even when a command is issued so that the first kernel Kernel1 and the second kernel Kernel2 are simultaneously executed, because the first fence fence1 has not been activated, the second kernel Kernel2 as the consumer kernel may not be executed until the first kernel Kernel1 as the producer kernel is executed. Similarly, even when a command is issued so that the second kernel Kernel2 and the third kernel Kernel3 are simultaneously executed, the third kernel Kernel3 may not be executed until the second fence fence2 is activated, and even when a command is issued so that the third kernel Kernel3 and the fourth kernel Kernel4 are simultaneously executed, the fourth kernel Kernel4 may not be executed until the third fence fence3 is activated. In a similar manner, because the fourth fence 4 is in an inactive state until the fourth kernel Kernel4 is executed, the NN execution may not be terminated. In an example embodiment, the delegator 210 may generate the event EVT notifying the completion of the NN execution after the fourth kernel Kernel4 is executed, and may terminate the NN execution.

Referring to FIG. 7, a type of a kernel, the number of fences, a type of a sync, a sync after optimization, and an identifier (ID) of a memory object in which a sync exists may be included as constituent elements of the NN data, but the embodiment is not limited thereto.

In an example embodiment, because the first kernel Kernel1 is a first kernel, there is no preceding producer kernel. Accordingly, there may be neither sync nor fence. A fence blocking the execution of the second kernel Kernel2 may be the first fence fence1, a sync included in the first fence fence1 may be the first sync sync1, and there may be the first sync sync1 between the second memory object mObj2 and the third memory object mObj3.

In an example embodiment, a fence blocking the execution of the third kernel Kernel3 may be the second fence fence2 including the second sync sync2 and the third sync sync3. Here, the second sync sync2 may be between the fourth memory object mObj4 and the fifth memory object mObj5, and the third sync sync3 may be between the third memory object mObj3 and the fifth memory object mObj5.

A fence of the fourth kernel Kernel4 may be the third fence fence3, a sync of the third fence fence3 may be the fourth sync sync4, and there may be a sync between the sixth memory object mObj6 and the seventh memory object mObj7.

In an example embodiment, a fence blocking execution of the delegator 210 may be the fourth fence fence4, and a sync included in the fourth fence fence4 may be the fifth sync sync5. The fourth fence4 may be behind the eighth memory object mObj8.

Optimization of the NN data described in operation S130 in FIG. 5 may be described with reference to FIGS. 6 and 7 together. As described above, because there is dependency between kernels, whether a preceding kernel has been executed may be verified by only verifying a trailing kernel of the preceding and trailing kernels.

In an example embodiment, two syncs, that is, the second sync sync2 and the third sync sync3, may be included in the second fence fence2 preventing the execution of the third kernel Kernel3. Because the second sync sync2 trails the first sync sync1, the execution of the second kernel Kernel2 may require the execution of the first kernel Kernel1. Accordingly, when the second sync sync2 is activated, it may be determined that the second kernel Kernel2 has been executed, and it may be concluded that the third sync sync3 is activated without a need for verifying a state thereof. In other words, because when the second sync sync2 has been activated, the third sync sync3 of the two syncs included in the second fence fence2 may be naturally activated, and it may not need to verify whether the third sync sync3 has been activated. Accordingly, as illustrated in FIG. 7, verification of one sync, that is, the second sync sync2 may be sufficient for verification of the two syncs, that is, the second sync sync2 and the third sync sync3, and the NN data may be optimized. By using the optimization of the NN data, the number of conditional statements or decision statements to be executed by a kernel may be reduced, and a processing speed of the kernel may be improved.

FIG. 8 is a block diagram of the GPU 200 according to an embodiment. FIG. 1 is also referred to in describing FIG. 8. The delegator 210 in FIG. 8 may be the same as the delegator 210 in FIG. 1, and repeated descriptions thereof are omitted.

Referring to FIG. 8, the GPU 200 may include the delegator 210, a command processor 230, and a graphics core 250.

The command processor 230 may process the plurality of commands CMDs received from the CPU 100. The command processor 230 may include any command processing unit resource that is immediately usable in the electronic device 10. In an example embodiment, the command processor 230 may include a single command processing unit that executes firmware supporting logical block addresses.

The graphics core 250 may include a core for processing graphics data. A plurality of kernels may be executed by the graphics core 250.

The delegator 210 according to an embodiment may connect data between the plurality of kernels based on the NN data, and may manage a data delegation time point. The delegator 210 may monitor a kernel event indicating execution completion of each of the plurality of kernels, and may delegate input/output between the kernels according to an occurrence of the kernel event. The delegator 210 may output the event EVT indicating completion of the NN execution to the CPU 100 in response to completion of execution of all kernels.

In FIG. 8, for convenience of explanation, the delegator 210 is illustrated as a separate functional unit from the command processor 230, but the embodiment is not limited thereto. For various implementations of the delegator 210, FIGS. 9A through 9D are provided.

FIGS. 9A, 9B, 9C, and 9D are diagrams of various examples of command processors 230a through 230d, respectively, according to embodiments. In FIGS. 9A through 9D, it is illustrated that the delegator 210 may be included in the command processor 230, may be a functional unit separate from the command processor 230, or may be implemented with software in the command processor 230 together with firmware. FIGS. 1 and 8 are also referred to in describing FIGS. 9.

Figure 9A:
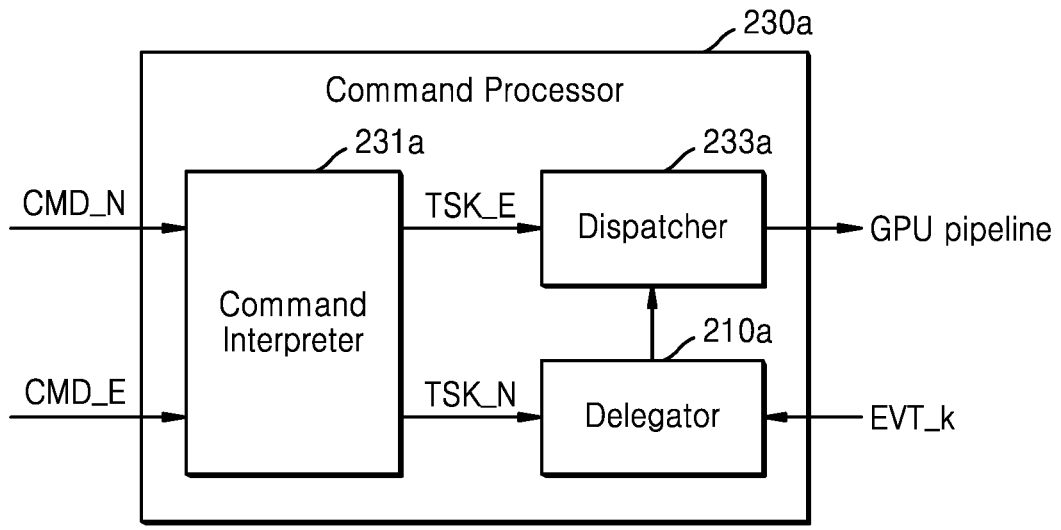
FIGS. 9A, 9B, 9C, and 9D are diagrams of various examples of a command processor according to embodiments.

Referring to FIG. 9A, the command processor 230a may include a command interpreter 231a, a dispatcher 233a, and a delegator 210a.

The command interpreter 231a may interpret the plurality of commands CMDs, and verify whether the NN execution is required. In an example embodiment, the command interpreter 231a may interpret an NN command CMD N referring to the NN data, and provide an NN task TSK_N to the delegator 210a. The delegator 210a may start an indirect-pipe input/output to delegate data between the kernels, and may receive a kernel event EVT_k indicating execution completion of each of the plurality of kernels. The delegator 210a may request scheduling to the dispatcher 233a for executing a next kernel to connect to a currently running kernel. The dispatcher 233a may schedule input tasks. As a result of the scheduling, tasks may be input to the graphics core 250 in a pipeline of the GPU 200. The delegator 210a is described in more detail with reference to FIG. 10.

In an embodiment, the command interpreter 231a may interpret a command CMD_E other than the NN execution, and transmit another task TSK_E to the dispatcher 233a to perform an operation other than the NN execution operation. The dispatcher 233a may immediately schedule commands other than the NN execution without passing through the delegator 210a.

Figure 9B:
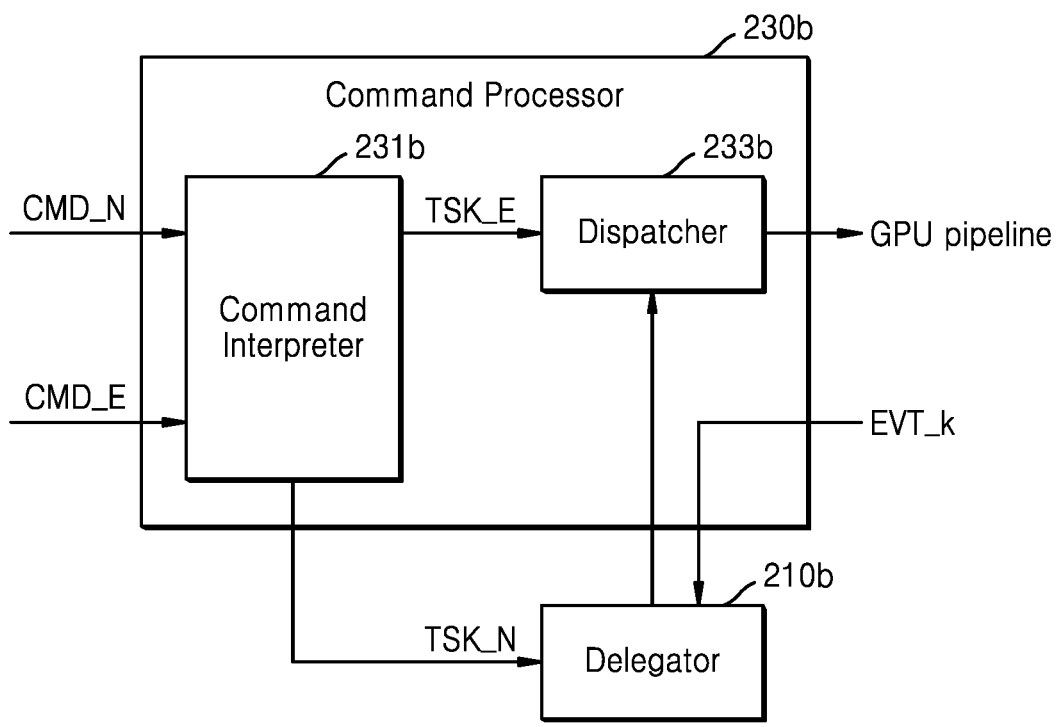
Figure 9C:
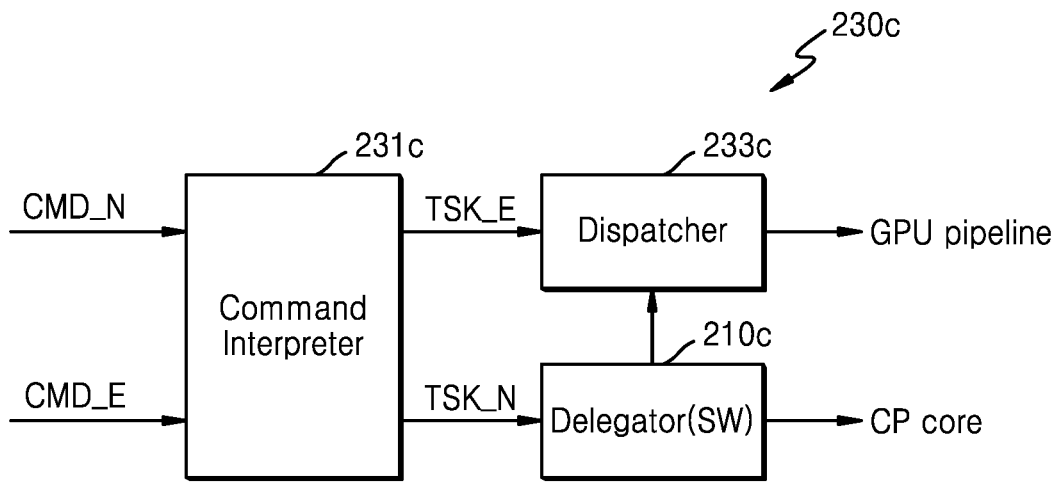
Figure 9D:
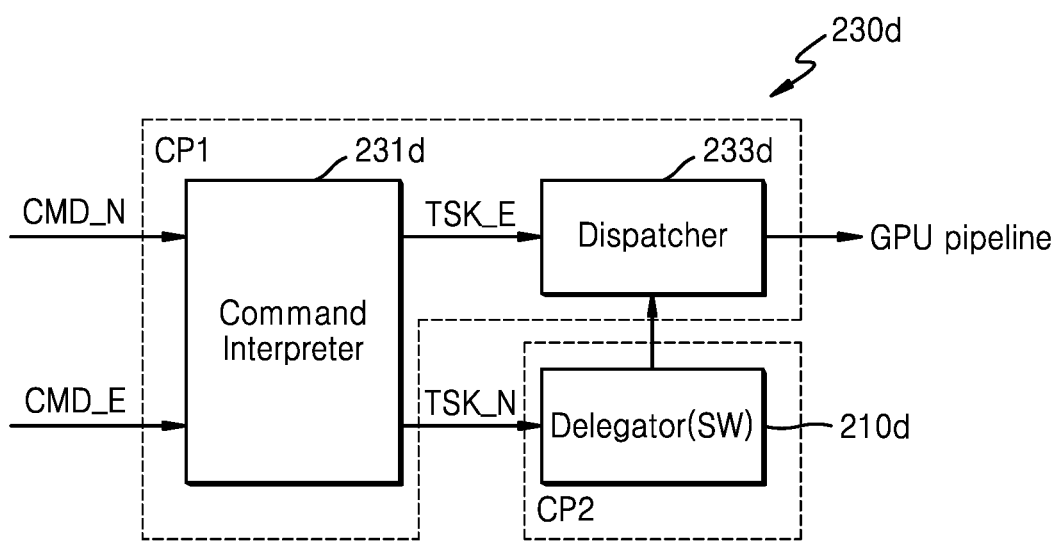

FIGS. 9B, 9C, and 9D are provided to explain differences from FIG. 9A.

Referring to FIG. 9B, the command processor 230b may include a command interpreter 231b and a dispatcher 233b. A delegator 210b may not be included in the command processor 230b. In other words, the delegator 210b may be implemented as an independent device. To prevent overhead, a kernel event EVT_k indicating execution completion of each of the plurality of kernels may be received via the command processor 230b.

Referring to FIG. 9C, the command processor 230c may include a command interpreter 231c and a dispatcher 233c. A delegator(SW) 210c may be implemented with software and executed in the command processor 230c. The command processor 230c may schedule the delegator(SW) 210c together with existing firmware.

Referring to FIG. 9D, the command processor 230d may include a command interpreter 231d and a dispatcher 233d. A delegator(SW) 210d may be implemented with software, but may be executed in a second core CP2 different from the first core CP1 of the command processor 230d. Here, the second core CP2 may include another available command processing unit resource that is not executing firmware of the first core CP1. Because the first core CP1 is separated from the second core CP2, computing resources for general processing operations and computing resources required for the NN execution may be efficiently distributed.

Figure 10:
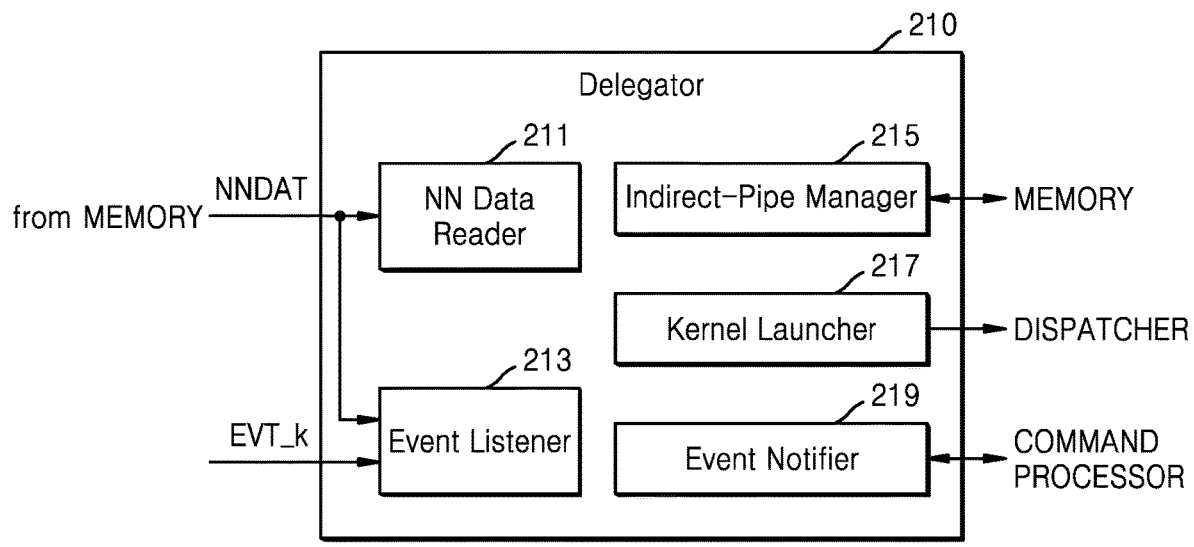
FIG. 10 is a block diagram of a delegator according to an embodiment.

FIG. 10 is a block diagram of the delegator 210 according to an embodiment. FIG. 8 is also referred to in describing FIG. 10.

Referring to FIG. 10, the delegator 210 may include an NN data reader 211, an event listener 213, an indirect-pipe manager 215, a kernel launcher 217, and an event notifier 219.

The NN data reader 211 may refer to NN data NNDAT (NN DATA in FIG. 7) from a memory, and read layer information about the NN. The event listener 213 may receive the kernel event EVT_k indicating execution completion of each of the plurality of kernels, and monitor sequential execution of the trailing kernels based on the NN data NNDAT.

The indirect-pipe manager 215 may manage the indirect-pipe based on the NN data NNDAT. The indirect-pipe manager 215 may create, update, and remove the indirect-pipe. The indirect-pipe manager 215 is described in more detail with reference to FIG. 11.

The kernel launcher 217 may request the dispatcher 233 to execute a trailing kernel of the kernel being processed based on the NN data NNDAT. The event notifier 219 may send the event EVT indicating execution completion of the NN to the CPU 100 via the command processor 230.

The delegator 210 according to an embodiment may generate a data structure including an indirect-pipe in response to a request for execution of a kernel, request to execute a trailing kernel of the kernel being processed, monitor the kernel event EVT_k indicating execution completion of the kernel being currently processed, and delegate input/output between the kernels. An operating method of the delegator 210 is described in more detail with reference to FIG. 12.

As described above, the NN data reader 211, the event listener 213, the indirect-pipe manager 215, the kernel launcher 217, and the event notifier 219 may be separately implemented as processing circuits such as hardware including digital logic circuits, or as a combination of hardware and software, such as a processor executing software.

Figure 11:
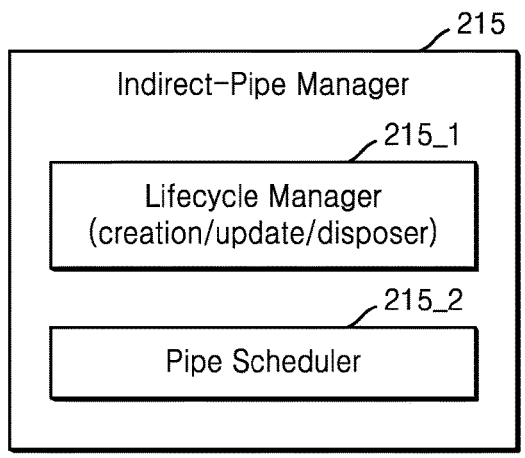
FIG. 11 is a block diagram of an indirect-pipe manager according to an embodiment.

FIG. 11 is a block diagram of the indirect-pipe manager 215 according to an embodiment.

The indirect-pipe manager 215 may include a lifecycle manager 215_1 and a pipe scheduler 215_2.

The lifecycle manager 215_1 according to an embodiment may verify the number and dependency of the kernels based on the NN data NNDAT, create the indirect-pipe in advance, or update an address written in the indirect-pipe, or remove the indirect-pipe out of service.

The pipe scheduler 215_2 may adjust a processing order of the indirect-pipes based on the NN data NNDAT. For example, based on the dependency between the kernels, the indirect-pipe of a preceding kernel may be executed before the indirect-pipe of a trailing kernel. However, the embodiment is not limited thereto, and the pipe scheduler 215_2 may adopt various scheduling policies according to properties and loads of the NN.

Figure 12:
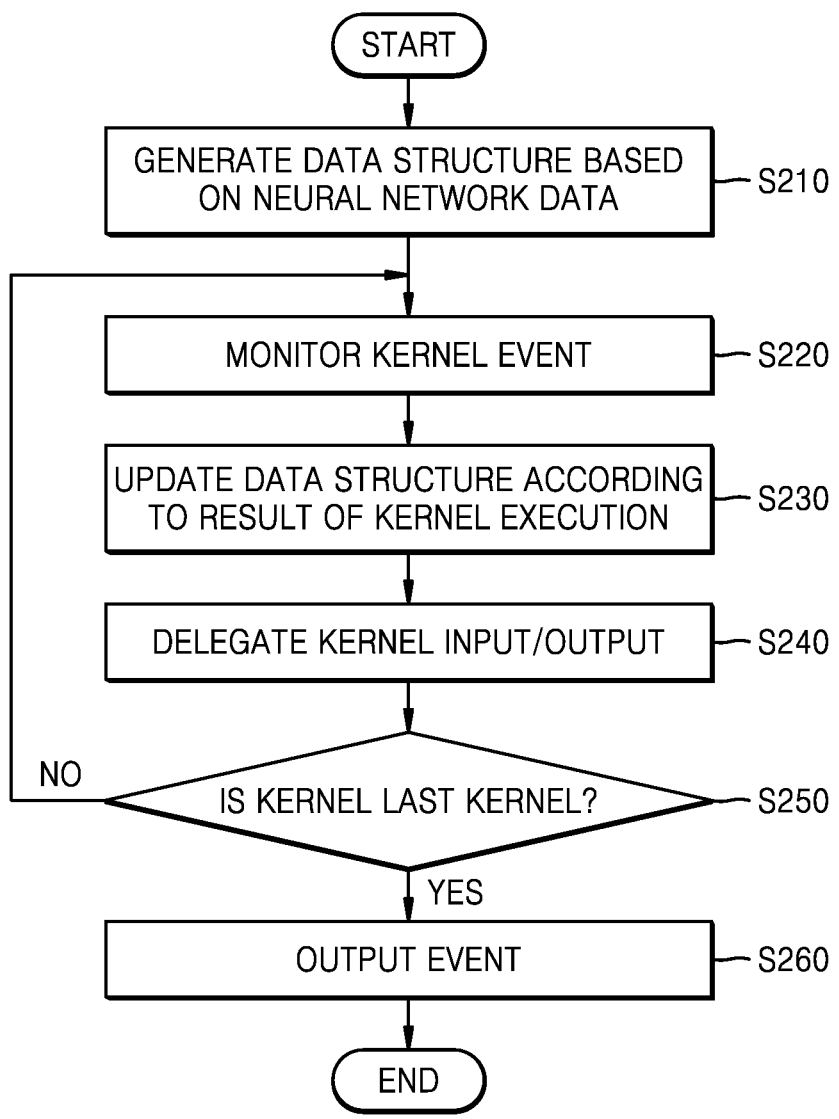
FIG. 12 is a flowchart of an operating method of a delegator, according to an embodiment.

FIG. 12 is a flowchart of an operating method of the delegator 210, according to an embodiment. FIGS. 8, 9A through 9D, 10, and 11 are also referred to in describing FIG. 12.

Referring to FIG. 12, the delegator 210 may start an initialization operation by receiving an NN command CMD_N (S210). By using the initialization operation, the delegator 210 may generate a data structure based on the NN data NNDAT. In an example embodiment, the data structure may include the indirect-pipe and/or the memory object. In this case, the indirect-pipe may include a data structure capable of managing a timing of delegating data between the kernels, and unlike a pipe in which data is directly written, the indirect-pipe according to the one or more embodiments may write an address of data. In addition, the memory object may include metadata that includes information about a location of data to be accessed by the kernel, and a type of data. For example, the input memory object may be a data structure that stores an address of data that is input to execute the kernel, and the output memory object may be a data structure that stores an address of the execution result data of the kernel. However, the embodiment is not limited thereto, and connection between the kernels by using various data structures may be performed. For convenience of description, it is assumed that the indirect-pipe is applied as the data structure in the one or more embodiments.

According to an embodiment, a start address of the indirect-pipe may be stored in an input memory object of a consumer kernel. In other words, the consumer kernel may access data corresponding to the address written in the indirect-pipe, by referring to the indirect-pipe.

Moreover, the data structure may be generated in advance in the initialization operation by referring to the NN data NNDAT, or may be generated just before execution of each of the plurality of kernels. In other words, a generation timing of the data structure may be actively adjusted according to a resources state of the GPU 200.

After generating the indirect-pipe, the delegator 210 may monitor an occurrence of the kernel event EVT_k indicating whether each of the plurality of kernels has been executed (S220). According to an embodiment, the delegator 210 may request the dispatcher 233 (shown in FIGS. 9A through 9D) to execute a first producer kernel in the NN data NNDAT. Depending on the resources state of the GPU 200, the delegator 210 may request the dispatcher 233 to execute the next kernel (consumer kernel) in addition to the requested kernel (producer kernel). Of course, when the resources state permits, it may be also possible to request execution of all kernels in advance at the same time. However, until the input data is generated (that is, until the address is written in the input data object), the consumer kernels may enter a standby state.

As the execution of the kernel (producer kernel) requested to the dispatcher 233 is completed according to an embodiment, the occurrence of the kernel event EVT_k may be verified.

The data structure may be updated according to the execution result of the kernel (S230). According to an embodiment, as the execution of the kernel is completed, the kernel event EVT_k may be provided to the delegator 210 via the command processor 230. According to the occurrence of the kernel event EVT_k, the delegator 210 may write an address corresponding to the data according to the execution of the kernel, in the output data object of the producer kernel.

The delegator 210 may delegate the input/output between the kernels (S240). According to an embodiment, the delegator 210 may delegate the address written in the output data object of the producer kernel to the input data object of the consumer kernel. The indirect-pipe may be used to delegate data between the kernels. Delegation of data by using the indirect-pipe is described in more detail with reference to FIG. 13.

The delegator 210 may determine whether the currently executed kernel is the last kernel by referring to the NN data NNDAT (S250). When the currently executed kernel is not the last kernel, the process may return to operation S220.

When the currently executed kernel is the last kernel, the delegator 210 may send the event EVT indicating completion of NN execution to the CPU 100 (S260). Thereafter, the operation of the delegator 210 may be terminated.

Figure 13:
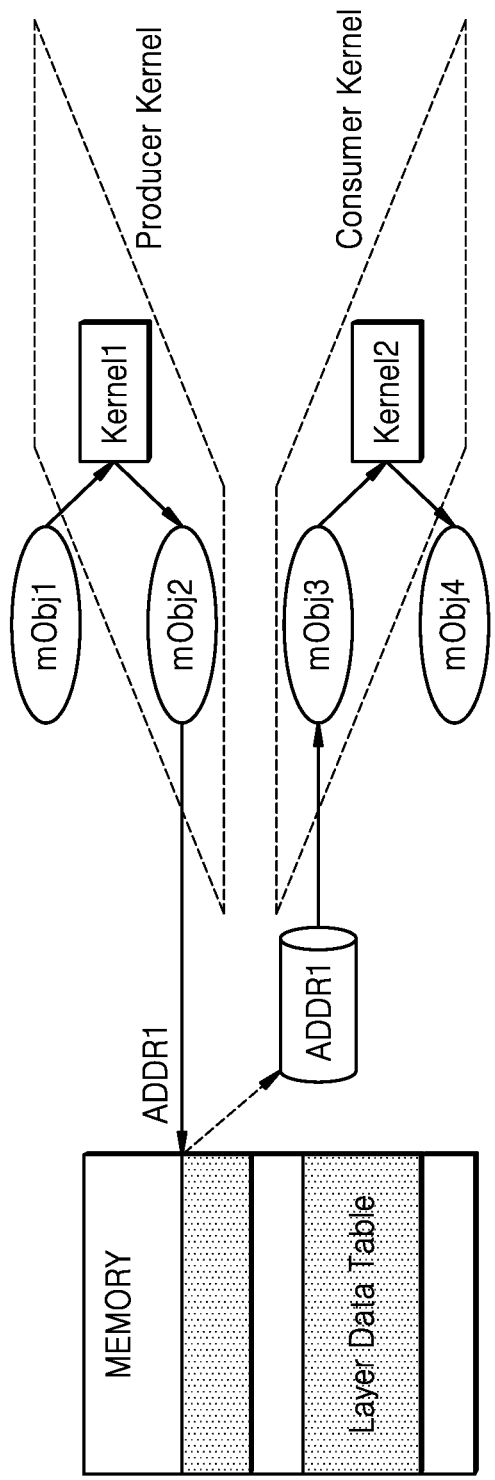
FIG. 13 is a conceptual diagram of a producer kernel and a consumer kernel, according to an embodiment.

FIG. 13 is a conceptual diagram of a producer kernel and a consumer kernel, according to an embodiment. FIGS. 1 and 12 are also referred to in describing FIG. 13. For convenience of explanation, it is assumed that there are only two kernels, however, the number of kernels are not limited thereto.

A kernel that generates a kernel execution result may be referred to as the producer kernel, and a kernel that uses the kernel execution result as an input of its own kernel by referring to the kernel execution result may be referred to as the consumer kernel. The first kernel Kernel1 and the second kernel Kernel2 may include the input memory objects (first memory object mObj1 and third memory object mObj3, respectively), and then output memory objects (second memory object mObj2 and fourth memory object mObj4, respectively).

According to an embodiment, the execution result of the first kernel Kernel1 may be stored in the memory, and the address in the memory may be a first address ADDR1. The first address ADDR1 may be written in the second memory object mObj2 that is the output memory object of the first kernel Kernel1. In other words, the second memory object mObj2 including the execution result of the first kernel Kernel1 and the first address ADDR1 may be stored at the first address ADDR1 of the memory.

When the execution of the first kernel Kernel1 (which is the producer kernel in this embodiment) is completed, the delegator 210 may verify the kernel event EVT_k. The delegator 210 may write the first address ADDR1 stored in the output memory object (i.e., second memory object mObj2) to the indirect-pipe. The second kernel Kernel2 (which is the consumer kernel waiting for an address to be written to the indirect-pipe in this embodiment), may write the first address ADDR1 to the input memory object (i.e., the third memory object mObj3). In this case, the second kernel Kernel2 may recognize the first address ADDR1 as an address in which actual data exists, and execute the kernel by reading the actual data from the first address ADDR1. In other words, the sync described with reference to FIG. 6 may be applied to the pipe. While the first kernel Kernel1 and the second kernel Kernel2 are described above as producer kernel and consumer kernel, respectively, the terms producer kernel and consumer kernel may variously change according to the relationship or connection between the kernels.

When there is no waiting kernel because the kernel execution has not been requested in advance, the delegator 210 may request the dispatcher 233 to execute the kernel based on the NN data NNDAT.

According to an embodiment, the plurality of kernels constituting the NN may not write inter-kernel connection relationship information directly into the kernel as described above, and such connection relationship information may be indirectly obtained by the NN data NNDAT.

In the above process, the input/output between the kernels may be performed only via the delegator 210, and an interaction between the host program executed by the CPU 100 and the kernel executed by the GPU 200 may be reduced.

Figure 14:
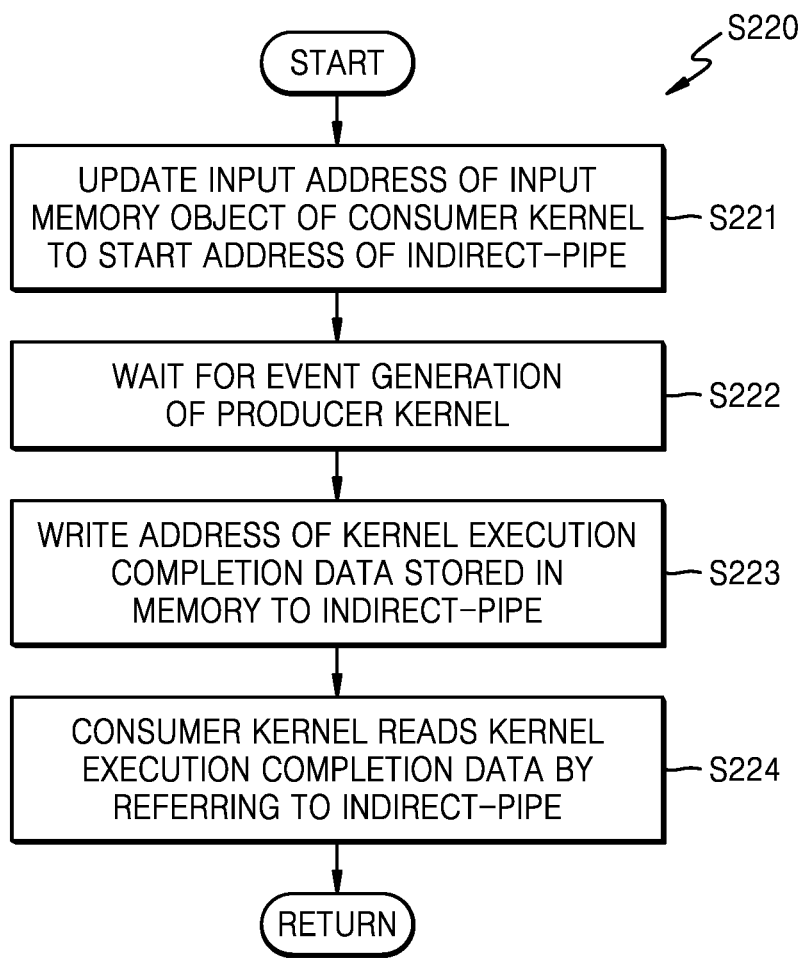
FIG. 14 is a flowchart of a portion of the operating method of FIG. 11 in more detail, according to an embodiment.

FIG. 14 is a flowchart of a portion of the operating method of FIG. 11 in more detail, according to an embodiment. FIG. 14 illustrates operation S220 in FIG. 12 in more detail. FIGS. 13 and 14 are also referred to in describing FIG. 14.

Referring to FIG. 14, the delegator 210 may update an input address of the input memory object of the consumer kernel to a start address of the indirect-pipe (S221). In an example embodiment, by writing the start address of the indirect-pipe to the input memory object (that is, the third memory object mObj3) of the second kernel Kernel2, which is the consumer kernel, the delegator 210 may delegate so that the address to be written to the indirect-pipe is referred to.

The delegator 210 may wait for the occurrence of the kernel event EVT_k indicating completion of the producer kernel (S222).

The delegator 210 may verify the occurrence of the kernel event EVT_k, and write the address of the kernel execution completion data stored in the memory to the indirect-pipe (S223). In an example embodiment, data according to the kernel execution completion may be written to the first address ADDR1 in the memory.

The consumer kernel may read the kernel execution completion data by referring to the indirect-pipe (S224). Here, because the first address ADDR1 stored in the indirect-pipe is the address in which data according to the kernel execution completion is stored, the consumer kernel (that is, the second kernel Kernel2) may access the kernel execution completion data by referring to the indirect-pipe.

Figure 15:
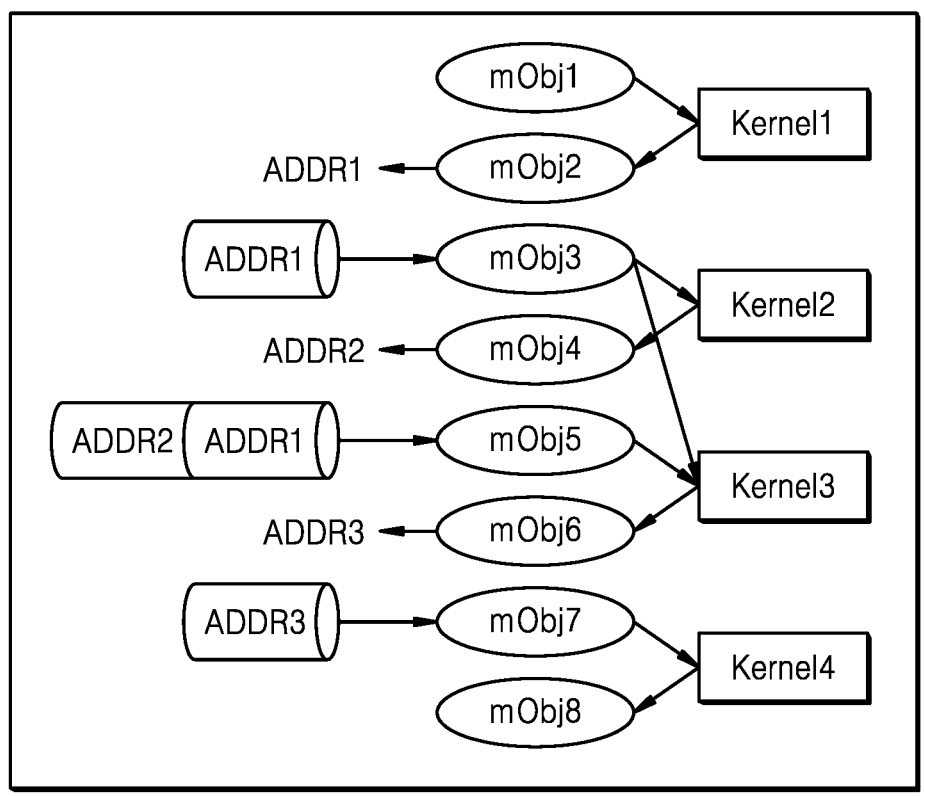
FIG. 15 is a conceptual diagram of an operation of a delegator according to an embodiment.
Figure 16:
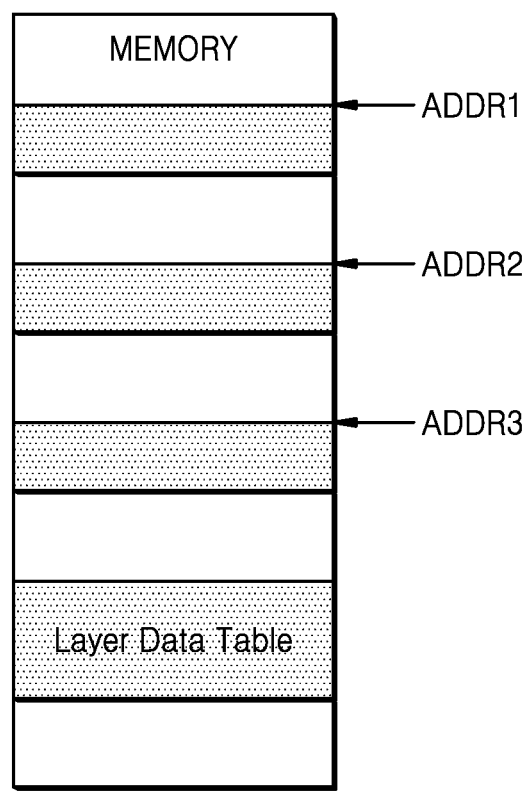
FIG. 16 is a diagram of a storage region of a memory according to an embodiment.

FIG. 15 is a conceptual diagram of an operation of a delegator according to an embodiment, and FIG. 16 is a diagram of a storage region of a memory according to an embodiment. FIGS. 1, 4, 12, and 14 are also referred to in describing FIGS. 15 and 16.

FIG. 4 may be again referred to for the kernel dependency. According to an embodiment, the NN requested to be executed may include four kernels. In other words, as described above, an execution result of the first kernel Kernel1 may be provided as an input to the second kernel Kernel2 and an input to the third kernel Kernel3, an execution result of the second kernel Kernel2 may be provided as an input to the third kernel Kernel3, and an execution result of the third kernel Kernel3 may be provided as an input to the fourth kernel Kernel4.

According to an embodiment, by referring to the NN data NNDAT, the delegator 210 may verify in advance connectivity between the kernels, dependency, and the number of inputs and outputs required for execution of the kernels.

A process in which the first address ADDR1 is written to the third memory object mObj3 of the second kernel Kernel2 is similar to that in FIG. 12, and thus, repeated descriptions thereof are omitted. Referring to FIG. 16, data according to the execution completion of the second kernel Kernel2 may be written to a second address ADDR2.

Referring to FIG. 15, the third kernel Kernel3 may have both the third memory object mObj3 and the fifth memory object mObj5 as the input memory objects. The delegator 210 may verify that the third kernel Kernel3 has two input memory objects by referring to the NN data NNDAT, and generate two indirect-pipes for delegating the third kernel Kernel3 with another kernel. In an example embodiment, the two indirect-pipes may be interpreted as an indirect-pipe of twice a length of one indirect-pipe. That is, the first address ADDR1 stored by the third memory object mObj3 may be written in the first indirect-pipe, and the second address ADDR2, in which data according to the execution completion of the second kernel Kernel2 is stored, may be written in a second indirect-pipe. The second address ADDR2 may be stored in the fourth memory object mObj4 that is the output memory object of the second kernel Kernel2.

Referring to FIG. 16, data according to the execution completion of the third kernel Kernel3 may be stored in the memory, and a memory address in this case may be a third address ADDR3. Similarly, the delegator 210 may write the third address ADDR3 to an indirect-pipe for delegating the fourth kernel Kernel4 with other kernels, and the fourth kernel Kernel4 may write the third address ADDR3 to the seventh memory object mObj 7 by referring to the indirect-pipe.

According to an example embodiment, the first kernel Kernel1 may include a sub-sampling kernel, the second kernel Kernel2 may include a convolution kernel, and the third kernel Kernel3 may include a softmax kernel. For each kernel to be executed by the host program, much interactions between the CPU 100 and the GPU 200 may be induced, thereby, decreasing the processing speed. However, the delegator 210 according to the one or more embodiments of the disclosure reduces the interaction with the CPU 100 when the plurality of kernels are executed.

Figure 17:
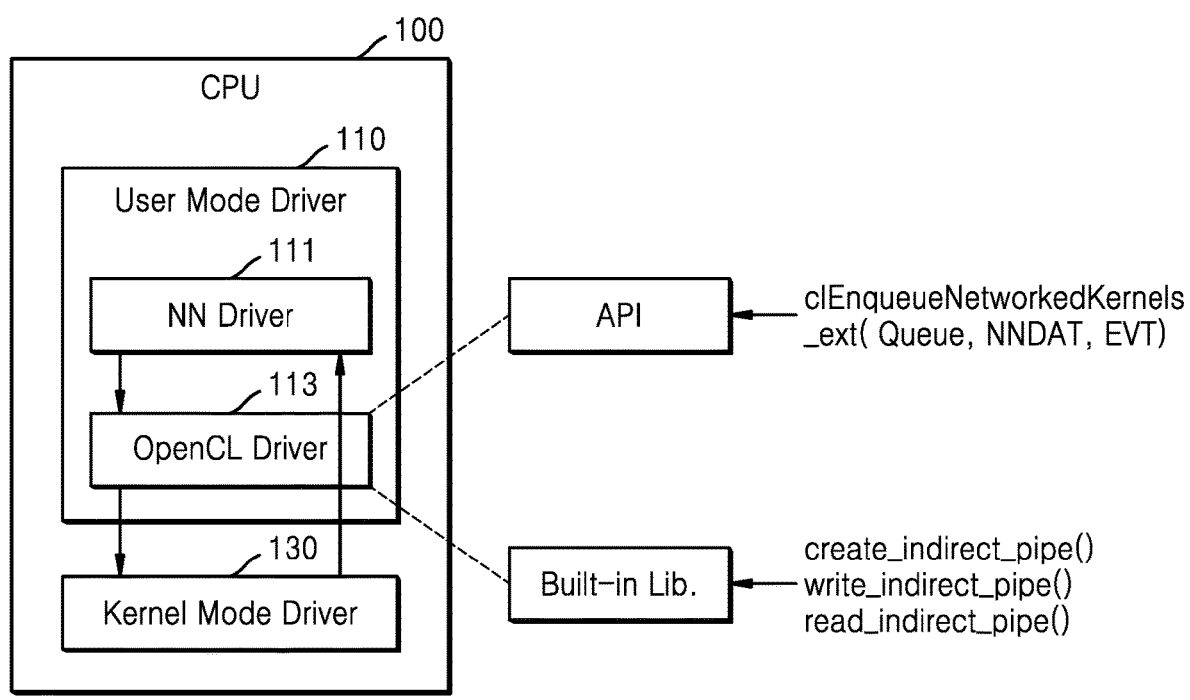
FIG. 17 is a block diagram of an OpenCL driver according to an embodiment.

FIG. 17 is a block diagram of an OpenCL driver according to an embodiment, and FIG. 18 is a table of a built-in library according to an embodiment.

Referring to FIG. 17, to generate the above-described data structure, an NN API command may be added to an API of an openCL provided by the openCL driver 113, and functions that are called from the delegator 210 may be provided by a built-in library provided by the openCL driver 113. In FIG. 17, functions such as create_indirect_pipe( ) write_indirect_pipe( ) and read_indirect_pipe( ) are expressed, but are only examples, and the functions provided by the built-in library are not limited thereto.

The NN API commands to be added may be as follows, but the API, parameter names, and an order thereof are not limited thereto.

For example, the NN API command may include a command such as clEnqueueNetworkedKernels_ext(Queue, NNDAT, EVT).

The NN API command according to an example embodiment may use a command queue Queue, the NN data NNDAT, and the event EVT as variables.

A command queue Queue may, as a command queue of the host, be a target to be flushed to a device queue of the GPU 200.

The NN data NNDAT may include a kernel, connectivity, data, data meta-information (that is, data type and number), and weight, as constituent components. In this case, the kernel may mean the number and type of kernels, and the connectivity may mean a connection relationship between the kernels. For example, the expression "the first kernel Kernel1→the second kernel Kernel2" may include an expression indicating a connection from the first kernel Kernel1 to the second kernel Kernel2. In an example embodiment, the connectivity may be converted to a sync within the openCL driver 113, which may be converted to an indirect-pipe by the delegator 210. Data may be a tool to be input/output for executing a kernel, and the weight may mean a weighting matrix of input data used in the kernel.

Referring to FIG. 18 together, functions to be added to the built-in library are as follows.

1. Indirect-Pipe Creating Function.
   (1) Function name: create indirect_pipe( )
   (2) Parameters: context, pipe_size, pipe_properties, and errcode ret.
   (3) Description: Create an indirect-pipe having pipe properties.
   (Here, the context may mean a context in a computing language, the pipe_size may mean a size of the indirect-pipe, and the pipe_properties may mean pipe properties. Among the pipe properties, there may be READ that is deleted after being read once, NREAD that is deleted after being read n times, and ALWAYS that is not deleted.)
2. Indirect-Pipe Input Function.
   (1) Function name: write_indirect_pipe( )
   (2) Parameters: pipe and addr.
   (3) Description: Write an address to the indirect-pipe.
   (Here, the pipe may mean a pipe object, and the addr may mean an address in which data is stored.)
3. Indirect-Pipe Read Function.
   (1) Function name: read_indirect_pipe( )
   (2) Parameter: pipe.
   (3) Description: Data included in the pipe is deleted according to pipe properties that is defined at pipe creation.

In addition, an initialization function (for example, memory object creation, data storage memory allocation, or the like) required by the delegator 210 before executing the kernel in the GPU 200 may be included in the built-in library. An inter-kernel delegation method using an openCL according to an example embodiment of the inventive concept is as follows.

First, an NN API command (clEnqueueNetworkedKernels ext(CMD Queue, NNDAT, EVT)) may be called.

As a result of the call, the NN command CMD N may be issued, and sent to the GPU 200.

Thereafter, the GPU 200 may execute a plurality of kernels in response to the NN command CMD_N. For example, the delegator 210 for controlling an execution order between the kernels may be generated in the command processor 230, and the delegator 210 may generate the indirect-pipe to form a connection channel between the kernels. To generate the indirect-pipe, the indirect-pipe creation function create_indirect_pipe( ) may be used. The address in which the execution results of the kernels are stored may be sent to the delegator 210, and the delegator 210 may cause an execution of a next kernel that has been waiting by writing the address to each indirect-pipe. When execution of all kernels for the NN is completed, the delegator 210 may send the event EVT indicating completion of the NN execution to the host program of the CPU 100.

Figure 19:
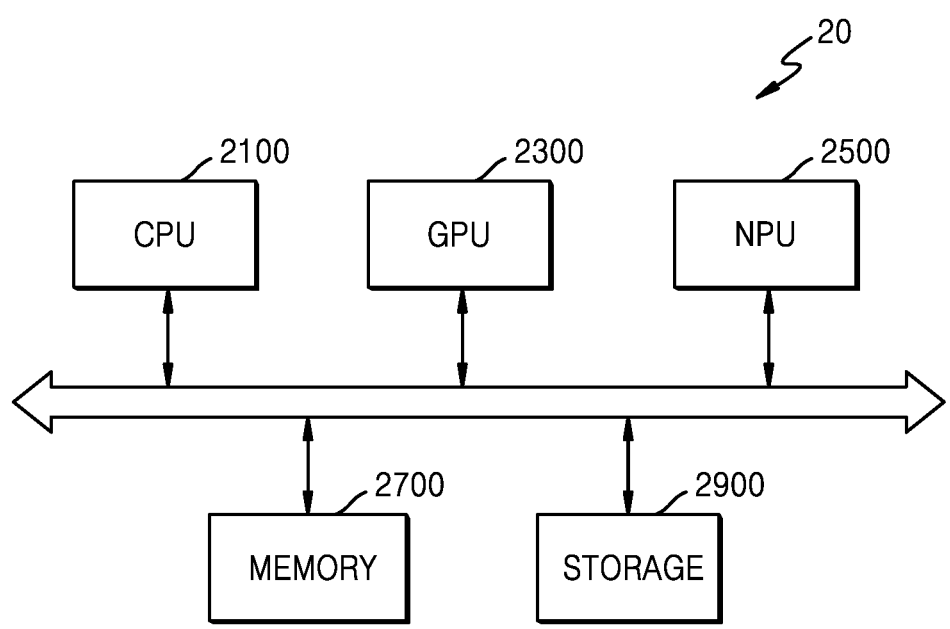
FIG. 19 is a block diagram of an electronic device according to an embodiment.

FIG. 19 is a block diagram of an electronic device 20 according to an embodiment. Because the electronic device 10 of FIG. 1 may be applied to FIG. 19, repeated descriptions thereof are omitted. FIGS. 1 and 16 are also referred to in describing FIG. 19.

Referring to FIG. 19, the electronic device 20 may analyze input data in real time based on the neural network NN, extract valid information, determine the state based on the extracted information, or control the components of the electronic device 20. For example, the electronic device 20 may be applied to a drone, an ADAS, a robot, a smart TV, a smartphone, a medical device, a mobile device, an image display device, a measurement device, IoT devices, and the like, and in addition, may be mounted on one of various kinds of electronic devices.

The electronic device 20 may include various types of IP blocks in addition to the illustrated functional units. For example, the IP blocks may include a processing unit, a plurality of cores included in the processing unit, a multi-format codec (MFC), a video module (for example, a camera interface, a joint photographic experts group (JPEG) processor, a video processor, a mixer, or the like), a 3D graphics core, an audio system, a driver, a display driver, a volatile memory, a non-volatile memory, a memory controller, an input and output interface block, a cache memory, etc.

A technology for connecting IPs may include a connection method based on a system bus. For example, as a standard specification of a bus, an advanced microcontroller bus architecture (AMBA) protocol of Advanced RISC Machine (ARM), Ltd. may be applied. A bus type of the AMBA protocol may include advanced high-performance bus (AHB), advanced peripheral bus (APB), advanced extensible interface (AXI), AXI4, AXI coherency extensions (ACE), or the like. Among the bus types described above, the AXI may be an interface protocol between IPs, and may provide a function of multiple outstanding address, data interleaving, or the like. In addition, other types of protocols may also be applied, such as uNetwork of SONICs Inc., CoreConnect of IBM Corporation, and open core protocol of OCP-IP.

The electronic device 20 may include a CPU 2100, a GPU 2300, an NN processor (NPU) 2500, a memory 2700, and a storage 2900.

The CPU 100 and the GPU 200 in FIG. 1 may be applied to the CPU 2100 and the GPU 2300 in FIG. 19, respectively. Repeated descriptions thereof are omitted.

The CPU 2100 may control overall operations of the electronic device 20, and for example, the CPU 2100 may include one processor core (or single core) or a plurality of processor cores (or multi-core). The CPU 2100 may process or execute programs and/or data stored in the memory 2700. For example, the CPU 2100 may control functions of the electronic device 20 by executing programs stored in the memory 2700.

The NPU 2500 may receive various types of input data via a system bus, and generate an information signal based on the input data. For example, the NPU 2500 may generate the information signal by performing a neural network operation on the input data, and the neural network operation may include the convolution operation.

The memory 2700 may be a storage area for storing data, and may store, for example, an operating system (OS), various programs and data. The memory 2700 may include dynamic random access memory (RAM) (DRAM), but is not limited thereto. The memory 2700 may include a volatile memory. The volatile memory may include DRAM, static RAM (SRAM), synchronous DRAM (SDRAM), phase-change RAM (PRAM), magnetic RAM (MRAM), resistive RAM (RRAM), ferroelectric RAM (FeRAM), etc. The memory of FIG. 16 may be applied to the memory 2700 in FIG. 19.

The storage 2900 may be a storage location for storing data, and may store various programs and various data. The storage 2900 may include a non-volatile memory. The non-volatile memory may include read-only memory (ROM), programmable ROM (PROM), electrically programmable ROM (EPROM), electrically erasable PROM (EEPROM), a flash memory, phase-change random-access memory (RAM) (PRAM), magnetic RAM (MRAM), resistive RAM (RRAM), ferroelectric RAM (FRAM), etc. In addition, in an embodiment, the storage 2900 may include at least one of a hard disk drive (HDD), a solid state drive (SSD), a compact flash (CF) storage, a secure digital (SD) storage, a micro secure digital Secure digital storage, an extreme digital (xD) storage, and a memory stick.

While the one or more embodiments of the disclosure have been particularly shown and described with reference to the accompanying drawings, it will be understood that various changes in form and details may be made therein without departing from the spirit and scope of the following claims.

What is claimed is:

1. A graphics processing unit (GPU) configured to process a neural network, the GPU comprising:
 a graphics core configured to execute a plurality of kernels;
 a command interpreter configured to determine whether neural network execution is required based on a command;
 a delegator connecting an input and an output of the plurality of kernels based on dependency between the plurality of kernels, and configured to receive neural network data indicating layer information of the neural network from a central processing unit (CPU), determine based on the neural network data whether a currently executed kernel is a last kernel, among the plurality of kernels, and output an event indicating a result of a neural network process to the CPU based on the currently executed kernel being the last kernel; and
 a dispatcher configured to schedule a process of a task according to the command,
 wherein the command interpreter is further configured to provide the task to the delegator based on determining the neural network execution is required, and bypass the delegator and provide the task directly to the dispatcher based on determining the neural network execution is not required,
 wherein the delegator generates an indirect-pipe storing an address of execution result data of a first kernel among the plurality of kernels, and
 wherein a second kernel among the plurality of kernels accesses and refers to the indirect-pipe storing the address of the execution result data of the first kernel.

2. The GPU of claim 1, further comprising a first command processor configured to process the command.

3. The GPU of claim 2, wherein the first command processor comprises the delegator.

4. The GPU of claim 3, wherein the delegator is integrated in the first command processor or provided as an independent unit separate from the first command processor.

5. The GPU of claim 2, wherein the delegator is executed by the first command processor.

6. The GPU of claim 1, wherein the delegator comprises:
 a neural network data reader configured to receive the neural network data from the CPU;
 an event listener configured to receive a kernel event indicating execution completion of each of the plurality of kernels;
 an indirect-pipe manager configured to manage an the indirect-pipe based on the neural network data;
 a kernel launcher configured to execute the plurality of kernels; and
 an event notifier configured to generate the event indicating completion of the neural network process.

7. The GPU of claim 6, wherein the indirect-pipe manager comprises:
 a lifecycle manager configured to create, update and remove the indirect-pipe; and
 a pipe scheduler configured to adjust a processing order of the indirect-pipe.

8. The GPU of claim 1, wherein operation of the delegator is terminated after the result of the neural network process is output to the CPU.

9. An operating method of a graphics processing unit (GPU) configured to process a neural network by executing a plurality of kernels comprising a first kernel and a second kernel, the operating method comprising:
- determining whether neural network execution is required based on a command;
- providing a task to a delegator based on determining the neural network execution is required,
- referring to neural network data indicating layer information of the neural network from a memory, based on determining the neural network execution is required;
- generating a data structure based on the neural network data;
- executing the first kernel;
- monitoring a kernel event indicating completion of the first kernel execution;
- updating the data structure in response to the kernel event;
- delegating the first kernel and the second kernel based on the neural network data;
- determining based on the neural network data whether a currently executed kernel is a last kernel, among the plurality of kernels; and
- outputting an event indicating a result of the neural network process to a central processing unit (CPU) based on the currently executed kernel being the last kernel,
- wherein the delegator is bypassed and the task is provided directly to a dispatcher based on determining the neural network execution is not required, and
- wherein the generating of the data structure comprises:
  - creating an indirect-pipe storing an address of a region in the memory in which an execution result of each of the plurality of kernels is stored; and
  - creating an input memory object and an output memory object of each of the plurality of kernels storing addresses of input data and output data of each of the plurality of kernels, respectively.

10. The operating method of claim 9, further comprising requesting an execution of the second kernel.

11. The operating method of claim 9, wherein the generating of the indirect-pipe comprises creating in advance at least one of indirect-pipes corresponding to dependency of the first kernel based on the neural network data.

12. The operating method of claim 9, wherein the updating of the data structure comprises writing an address of execution result data of the first kernel to the indirect-pipe.

13. The operating method of claim 9, wherein the delegating of the first kernel and the second kernel comprises storing an address of the indirect-pipe to an input memory object of the second kernel.

14. An electronic device configured to process a neural network, the electronic device comprising:
- a central processing unit (CPU) comprising a user mode driver and a kernel mode driver, and configured to drive a host program; and
- a graphics processing unit (GPU) comprising a command interpreter, a dispatcher, a graphics core and a delegator, and configured to execute a plurality of kernels comprising a first kernel and a second kernel,
- wherein the CPU generates neural network data based on layer information of the neural network, and issues a neural network command based on the neural network data, and
- wherein the delegator of the GPU connects inputs and outputs of the plurality of kernels based on the neural network data in the neural network command, receives neural network data indicating layer information of the neural network from the CPU, determines based on the neural network data whether a currently executed kernel is a last kernel, among the plurality of kernels, and outputs an event that is a result of a neural network process to the CPU based on the currently executed kernel being the last kernel,
- wherein the command interpreter is configured to determine whether neural network execution is required based on a command,
- wherein the dispatcher is configured to schedule a process of a task according to the command,
- wherein the command interpreter is configured to provide the task to the delegator based on determining the neural network execution is required, and bypass the delegator and provide the task directly to the dispatcher based on determining the neural network execution is not required,
- wherein the delegator creates an indirect-pipe storing an address of a region in which an execution result of each of the plurality of kernels is stored, and stores in the indirect-pipe an address of execution result data of the first kernel, and
- wherein the second kernel accesses and refers to the indirect-pipe storing the address of the execution result data of the first kernel.

15. The electronic device of claim 14, wherein the user mode driver analyzes dependency between the plurality of kernels for driving the neural network according to a request for the neural network process, generates the neural network data, and stores the event.

16. The electronic device of claim 14, wherein the delegator creates an input memory object and an output memory object of each of the plurality of kernels storing addresses of input data and output data of each of the plurality of kernels, respectively, and stores an address of the indirect-pipe to the input memory object of the second kernel.

* * * * *